US006422417B1

(12) United States Patent
Rawlins

(10) Patent No.: US 6,422,417 B1
(45) Date of Patent: Jul. 23, 2002

(54) CIGARETTE VENDING MACHINE AND VENDING MACHINE DISPENSER

(75) Inventor: Mark Wayne Rawlins, Surrey (CA)

(73) Assignee: Slim Line Designs Ltd., Surrey (CA)

( * ) Notice: Subject to any disclaimer, the term of this patent is extended or adjusted under 35 U.S.C. 154(b) by 59 days.

(21) Appl. No.: 09/638,876

(22) Filed: Aug. 15, 2000

(51) Int. Cl.[7] .............................................. B65G 59/00

(52) U.S. Cl. ...................... 221/124; 221/195; 221/251; 221/270

(58) Field of Search ................................ 221/124, 195, 221/251, 270, 268; 312/42

(56) References Cited

U.S. PATENT DOCUMENTS

| | | | | |
|---|---|---|---|---|
| 530,561 A | | 12/1894 | Thissell | |
| 3,254,792 A | | 6/1966 | Danielson et al. | 221/14 |
| 3,757,998 A | | 9/1973 | Millies et al. | 221/242 |
| 4,865,222 A | * | 9/1989 | Sullivan | 221/241 |
| 4,867,628 A | | 9/1989 | Ammon et al. | 414/273 |
| 6,082,578 A | * | 7/2000 | Miyoshi et al. | 221/124 X |

FOREIGN PATENT DOCUMENTS

| | | |
|---|---|---|
| GB | 1238734 | 7/1971 |

* cited by examiner

*Primary Examiner*—David H. Bollinger
(74) *Attorney, Agent, or Firm*—Bull, Housser & Tupper

(57) ABSTRACT

A cigarette package vending machine for selectively dispensing cigarette packages on actuation by a user includes at least one cigarette package storage and dispensing container. The container includes a storage region for storing a plurality of cigarette packages, a holding region communicating with a storage region to receive the first cigarette package from the plurality in the storage region and an output region communicating with the holding region to receive the first cigarette package from the holding region for dispensing the first cigarette package from the output region to the user. A dispenser is provided which is moveable between a rest position and an open position. The dispenser holds the first cigarette package in the holding region when the dispenser is in the rest position on actuation by a user the dispenser first moves to its open position from its rest position to cause the first cigarette package to move from the holding region to the output region. Simultaneously, the dispenser moves behind the second cigarette package of the plurality. The dispenser then moves from its open position to its rest position to dispense the first cigarette package from the output region to the user and simultaneously move a second cigarette package of the plurality from the storage region to the holding region.

23 Claims, 14 Drawing Sheets

CIGARETTE VENDING MACHINE AND VENDING MACHINE DISPENSER

BACKGROUND OF THE INVENTION

Field of the Invention

The present invention relates to vending machines and more particularly to a cigarette vending machine which, on actuation by a user, simultaneously dispenses a selected cigarette package to the user while moving another cigarette package from a storage region of the vending machine to a holding region of the vending machine.

SUMMARY OF THE INVENTION

A vending machine for selectively dispensing cigarette packages on actuation by a user, includes at least one cigarette package storage and dispensing container. The container includes a storage region for storing a plurality of cigarette packages, a holding region communicating with the storage region to receive a first cigarette package from the plurality in the storage region and an output region communicating with the holding region to receive the first cigarette package from the holding region for dispensing the first cigarette package from the output region to the user.

The dispenser is provided movable between a rest position and an open position. The dispenser holds the first cigarette package in the holding region when the dispenser is in its rest position. On actuation by a user, the dispenser first moves to its open position from its rest position to cause the first cigarette package to move from the holding region to the output region. The dispenser then moves from its open position to its rest position to dispense the first cigarette package from the output region to the user and simultaneously move a second cigarette package of the plurality from the storage region to the holding region.

The vending machine may optionally include a viewing window for viewing at least some of the identification indicia of the first cigarette package in the holding region of the container. The dispenser may include a platform for holding the first cigarette package in the holding region when the dispenser is in its rest position. The dispenser may include a first pusher connected to the platform, the first pusher contacting the first cigarette package in the output region on movement of the dispenser from its open position to its rest position to move the first cigarette package from the output region to the user.

The vending machine may further include a second pusher connected to the platform, the second pusher contacting the second cigarette package of the plurality in the storage region on movement of the dispenser from its open position to its rest position, to move the second cigarette package from the storage region to the holding region.

The second pusher may also include a guide configured to facilitate movement of the second pusher past the second cigarette package of the plurality in the storage region when the dispenser is moved from its rest position to its open position. The pusher may be positioned adjacent the second cigarette package of the plurality of the cigarette packages in the holding region on the side of the second cigarette package opposite the side adjacent the holding region when the dispenser is in its open position.

Interference means may be provided preventing movement of the first cigarette package in the direction of movement of the platform when the dispenser is moved from its rest position to its open position. The platform may be located above the output region when the dispenser is in its rest position to form an opening from the holding region to the output region when the dispenser is moved to its open position to permit the first cigarette package in the holding region to move into the output region.

The first cigarette package may be accessible by a user for removal when the dispenser is moved to its rest position to dispense the first cigarette package from the output region. The platform of the dispenser blocks the access to the output region preventing removal of cigarette packages from the output region by a user when the dispenser is in its rest position.

The platform of the dispenser may be constrained for lateral movement between a first position, when the dispenser is in its rest position, and a second position, when the dispenser is in its open position. The platform further includes a slot perpendicular to the direction of movement between the first and second positions and the vending machine further includes a rotatable disc connected to a pin. The pin travels within the slot upon rotation of the disc to move the platform between the first and second positions.

DETAILED DESCRIPTION OF THE PREFERRED EMBODIMENT

Figure 1:
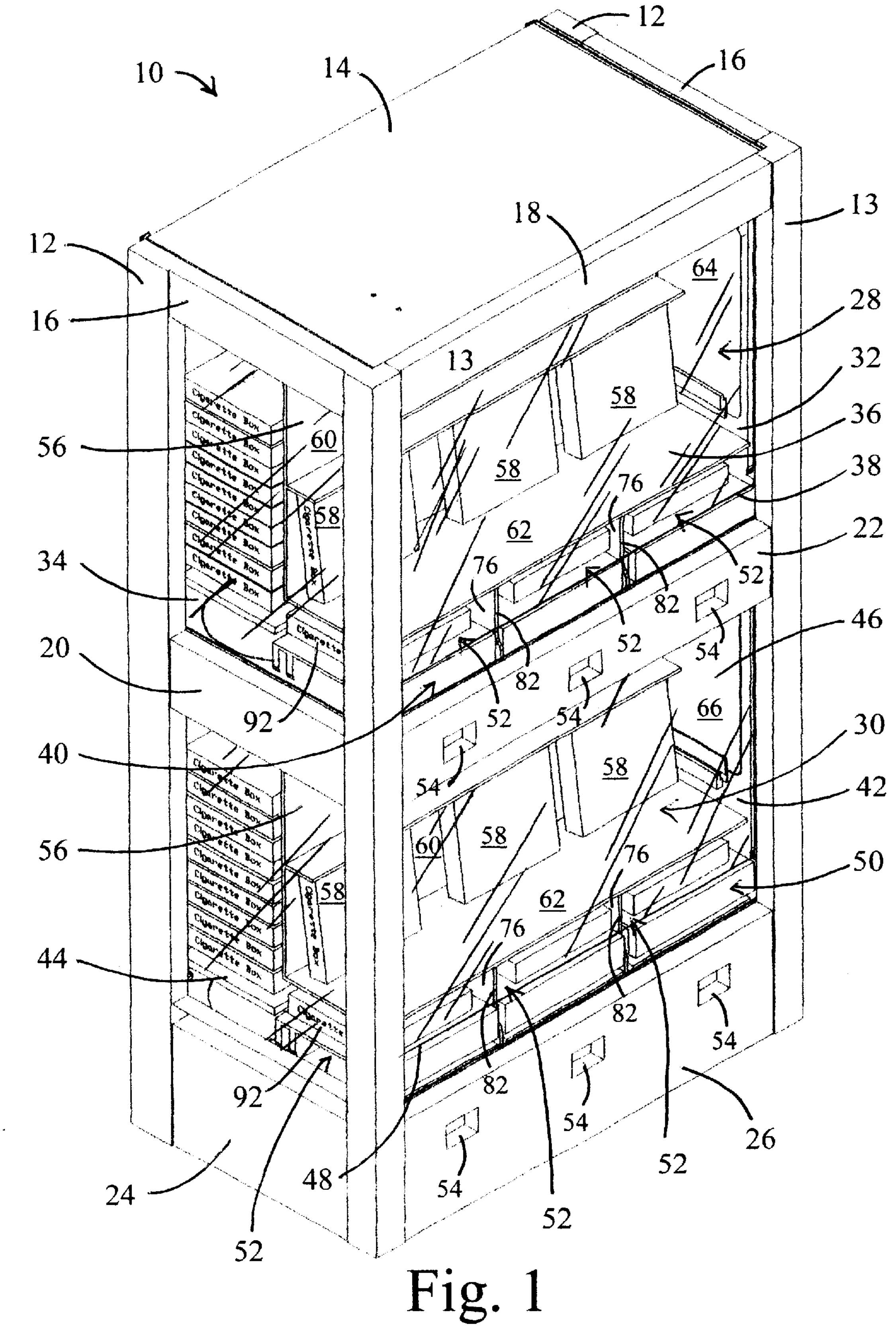
FIG. 1 is a perspective view of an embodiment of the vending machine of the present invention.

FIG. 1 depicts a cigarette package vending machine 10 suitable for mounting on a wall. Vending machine 10 is actuated by a user depositing the required funds in the vending machine to actuate the vending machine to dispense the desired package to that user.

Vending machine 10 includes two rear corner posts 12 and two front corner posts 13 extending from top plate 14 to the bottom of machine 10. A pair of opposed upper cross members 16 extend between adjacent rear corner posts 12 and front corner posts 13, along each side of vending machine 10. Upper front member 18 extends across the front of vending machine 10 between opposed front comer posts 13.

A pair of mid cross members 20 extend below upper cross members 16 between adjacent rear comer posts 12 and front comer posts 13, on each side of vending machine 10. Mid front member 22 extends across front corner posts 13 at the front of vending machine 10, below upper front member 18.

Similarly, lower cross members 24 extend between adjacent rear comer posts 12 and front corner posts 13 at each side of vending machine 10 and lower front member 26 extends across the front of vending machine 10 between front corner posts 13 at the front of vending machine 10.

Vending machine 10 includes upper housing 28 defined by top plate 14 and a planar segment defined by mid cross members 20 and mid front member 22 and a lower housing 30 defined by the said planar region and a planar region defined by lower cross members 24 and lower front member 26. A clear upper left Plexiglass sheet 32 and upper right Plexiglass sheet 34 cover the left and right sides, respectively, of upper housing 28. Plexiglass sheets 32 and 34 extend between adjacent comer posts 12, upper cross members 16 and mid cross member 20 of vending machine 10.

Upper front Plexiglas sheet 36 extends across substantially all of the front portion of upper housing 28 between front comer posts 13 and upper front member 18. Bottom edge 38 of sheet 36 extends between front comer posts 13 at the front of vending machine 10 to form opening 40 extending between front posts 13, mid front member 22 and edge 38.

Similar to upper housing 28, lower housing 30 includes left and right Plexiglass sheets 42 and 44 respectively extending between adjacent corner posts 12 and 13, mid cross members 20 and lower cross members 24. Lower front plexiglass sheet 46 extends across front corner posts 13 at each side and mid front member 22 at the top. Lower edge 48 of lower front plexiglass sheet extends between front comer posts 13 to form opening 50 between front comer posts 13, lower front member 26 and edge 48.

Each of upper and lower housings 28 and 30 include three cigarette package storage and dispensing containers 52. Each container 52 includes switch 54 to actuate vending machine 10 to dispense the desired cigarette package to that user.

Each upper and lower housing 28 and 30 includes a display case 56 for displaying cigarette packages 58 in an upright position visible to a user and aligned with each of containers 52 to display the brand of cigarettes which may be dispensed from the adjacent container 52. Display case 56 includes rear panel 60 and bottom panel 62 connected to each other at a right angle.

Upper left plexiglass sheet 32 and lower left plexiglass sheet 42 include respective access doors 64 and 66 which are accessed through a locking means to permit removal and insertion of cigarette packages 58 in display case 56.

Figure 2:
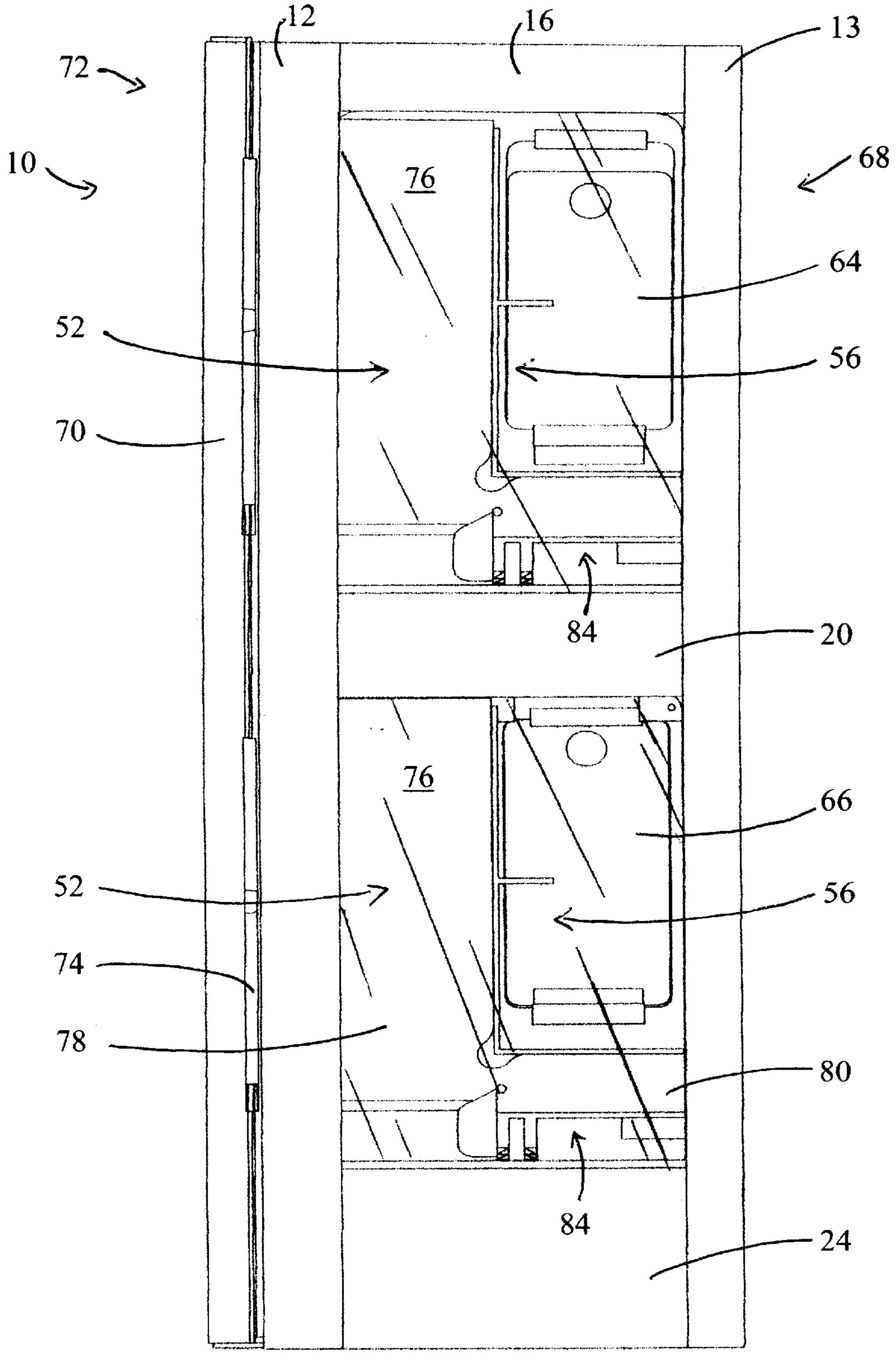
FIG. 2 is a side view of the vending machine of FIG. 1.

FIG. 2 is a side view showing the right side of vending machine 10. The front 68 of vending machine 10 includes front comer posts 13 and rear corner posts 12, as well as upper cross member 16, mid cross member 20 and lower cross member 24. Rear panel 70 extends across the rear portion 72 of vending machine. Panel 70 is attached to the right rear comer post 12 by means of hinge 74. Panel 70 may be attached to a wall and hinge 74 used to swing the vending machine other than panel 70, outwardly to permit the replacement of cigarette packages in each container 52 when vending machine 10 is refilled. When panel 70 is positioned adjacent vending machine access to cigarette packages in the vending machine is prevented, except upon actuation by engaging switch 54.

Containers 52 are separated from one another by means of L-shaped plexiglass dividers 76. Dividers 76 include upper portion 78 connected to lower portion 80 of divider 76. As best seen in FIG. 1, front edge 82 of lower portion 80 contacts adjacent upper and lower front Plexiglass sheets 36 and 46. Edge 82 is curved outwardly to extend into adjacent openings 40 and 50.

Each container 52 includes a dispenser 84 for dispensing cigarette packages from the vending machine 10.

Figure 3:
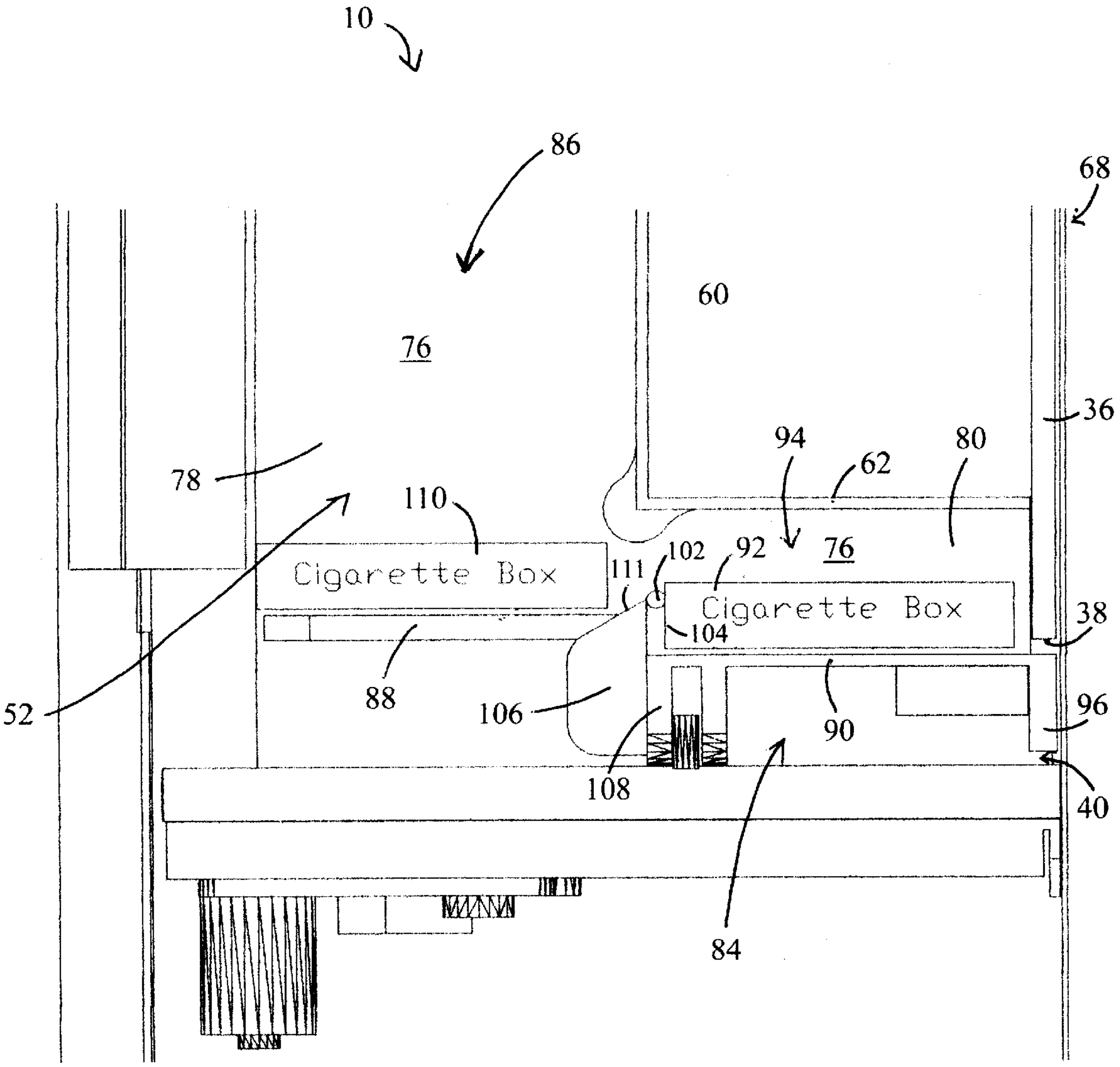
FIG. 3 is a side view of one of the cigarette package storage and dispensing containers of the vending machine of FIG. 1, showing the dispenser in the rest position.
Figure 4:
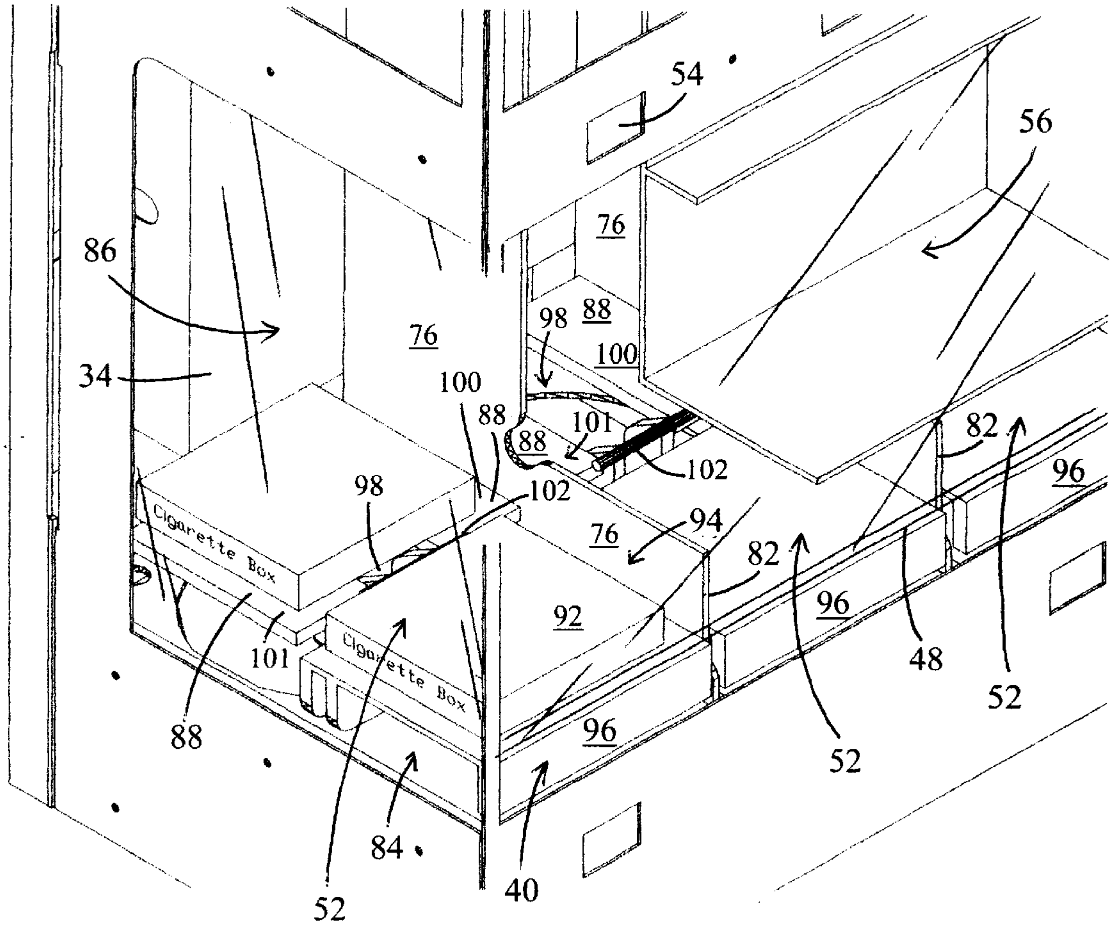
FIG. 4 is a perspective view of the container of FIG. 3, showing the dispenser in the rest position.

Referring to FIG. 3 and FIG. 4, dispenser 84 of container 52 is shown in its rest position. Container 52 includes cigarette storage region 86 for storing a plurality of cigarette packages in a vertical stack in region 86. The plurality of cigarette packages in storage region 86 are supported by platform 88 which is rigidly fixed to divider 76. Dispenser 84 includes movable platform 90 which supports first cigarette package 92 in a holding region 94 of container 52. As is readily apparent, cigarette package 92 may be viewed from the front 68 of vending machine 10 through upper front plexiglass sheet 36. Movable platform 90 includes flange 96 extending downwardly to substantially block opening 40, when the dispenser 84 is in its rest position, as depicted in FIG. 3. Platform 88 includes a slot 98 extending between left and right segments 100 and 101 respectively of platform 88.

Dispenser 84 also includes bar 102 extending horizontally across a mid portion of container 52. Bar 102 is dimensioned in height to contact an edge 104 of cigarette package 92, as depicted in FIG. 3. Bar 102 is supported by a pair of lateral flanges 106 which are, in turn, connected to rear flange 108 of platform 90. Lateral flanges 106 include angled surface 111 at an upper region of flanges 106 forming a guide to facilitate movement of flange 106 and bar 102 underneath second cigarette package 110 as described below.

As seen in FIG. 4 a pair of dividers 76 define three adjacent containers 52 in each of upper housing 28 and lower housing 30. Upper left and right plexiglass sheets 32 and 34 form the outer sides of the outer two containers 52, respectively of upper housing 28 and lower left and right plexiglass sheets 42 and 44 form the outer sides of the outer two containers 52, respectively of lower housing 30.

Figure 5:
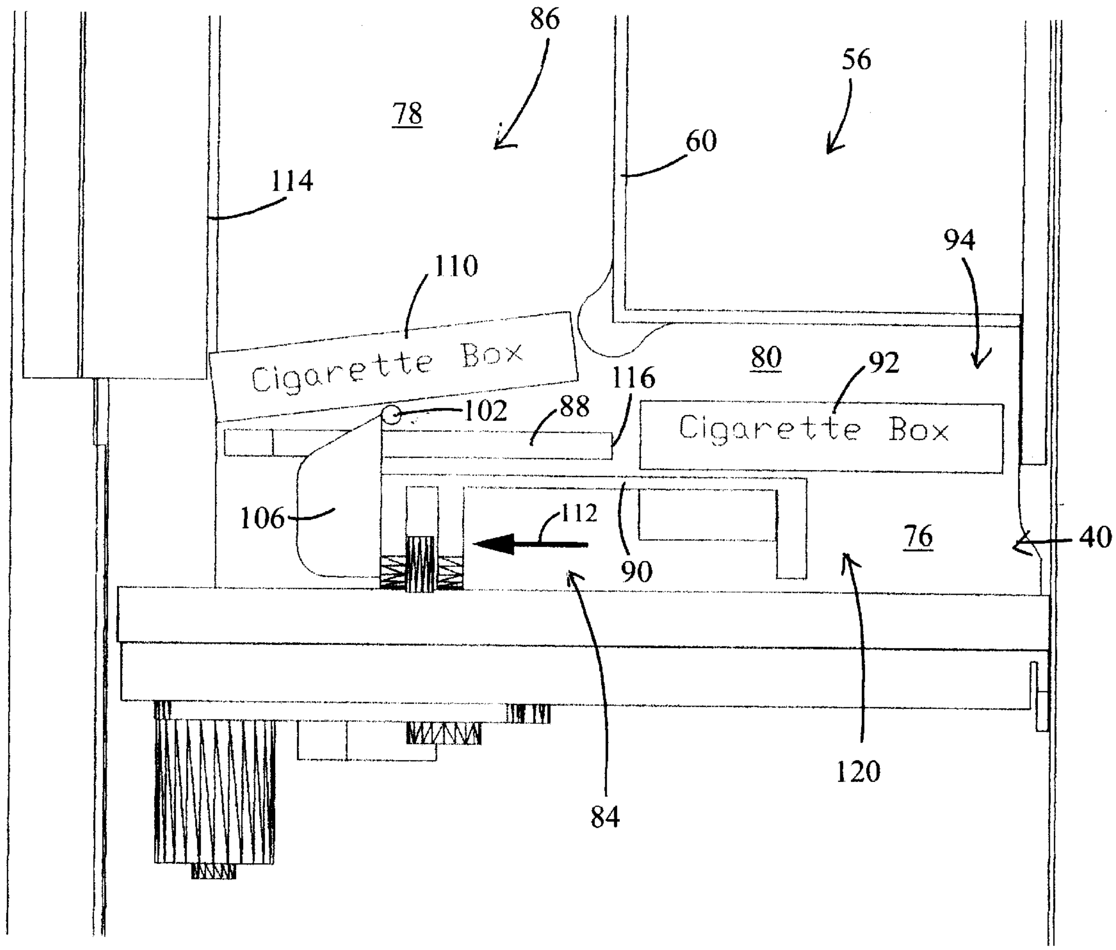
FIG. 5 is a side view of the container of FIG. 3, showing the dispenser in an intermediate position moving from its rest position to its open position.
Figure 6:
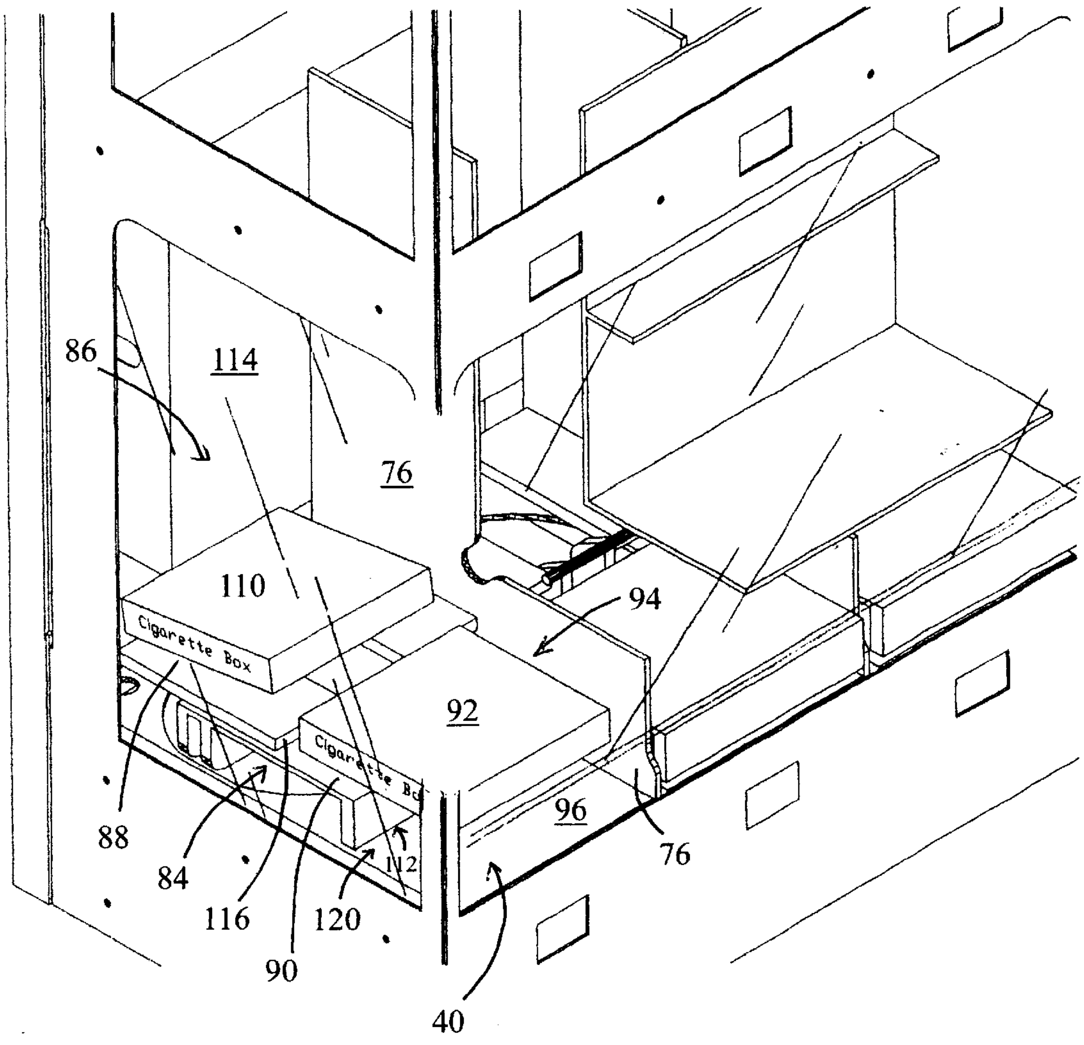
FIG. 6 is a perspective view of the container of FIG. 3, showing the dispenser in an intermediate position moving from its rest position to its open position.
Figure 7:
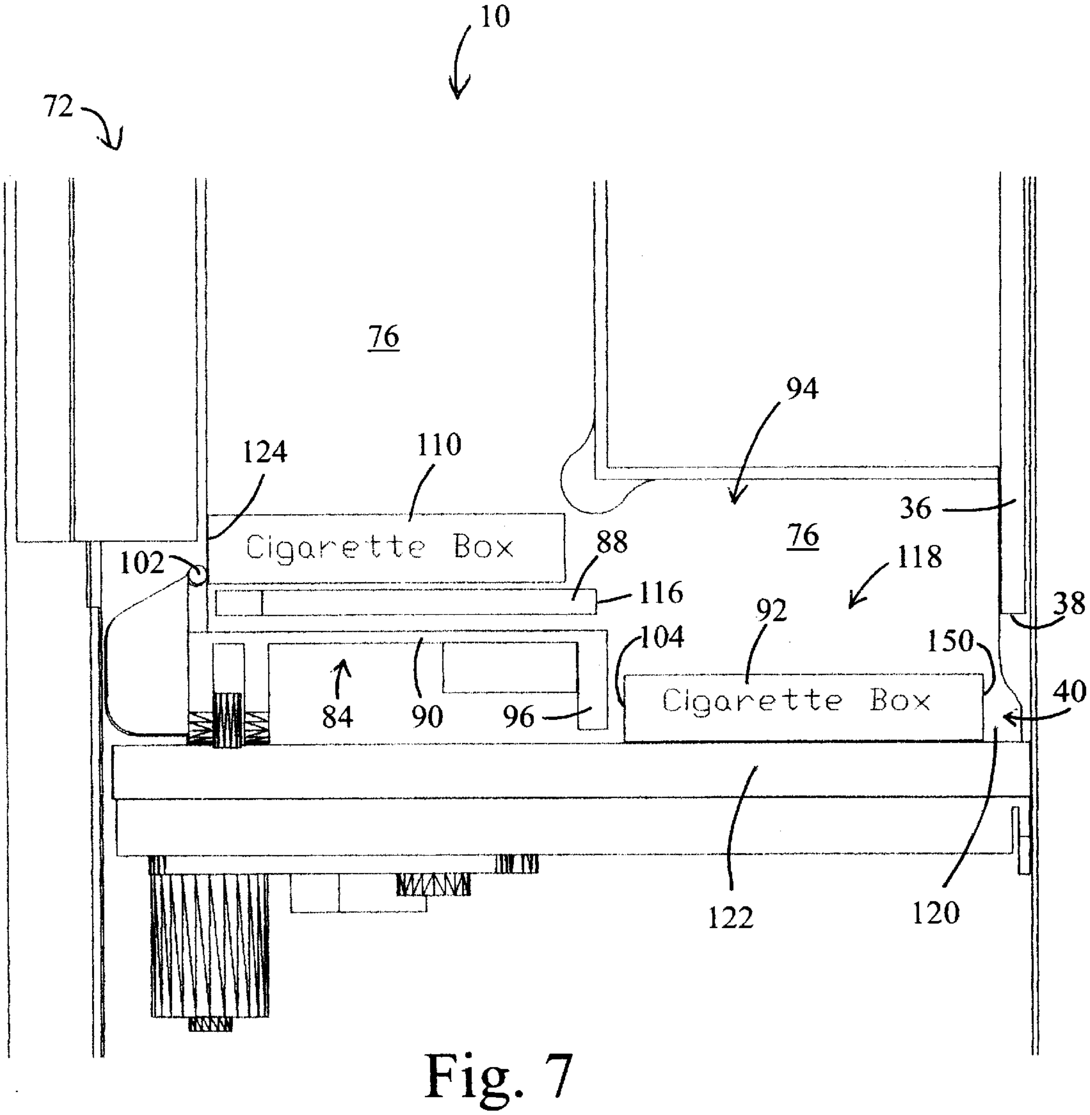
FIG. 7 is a side view of the container of FIG. 3, showing the dispenser in its open position.
Figure 8:
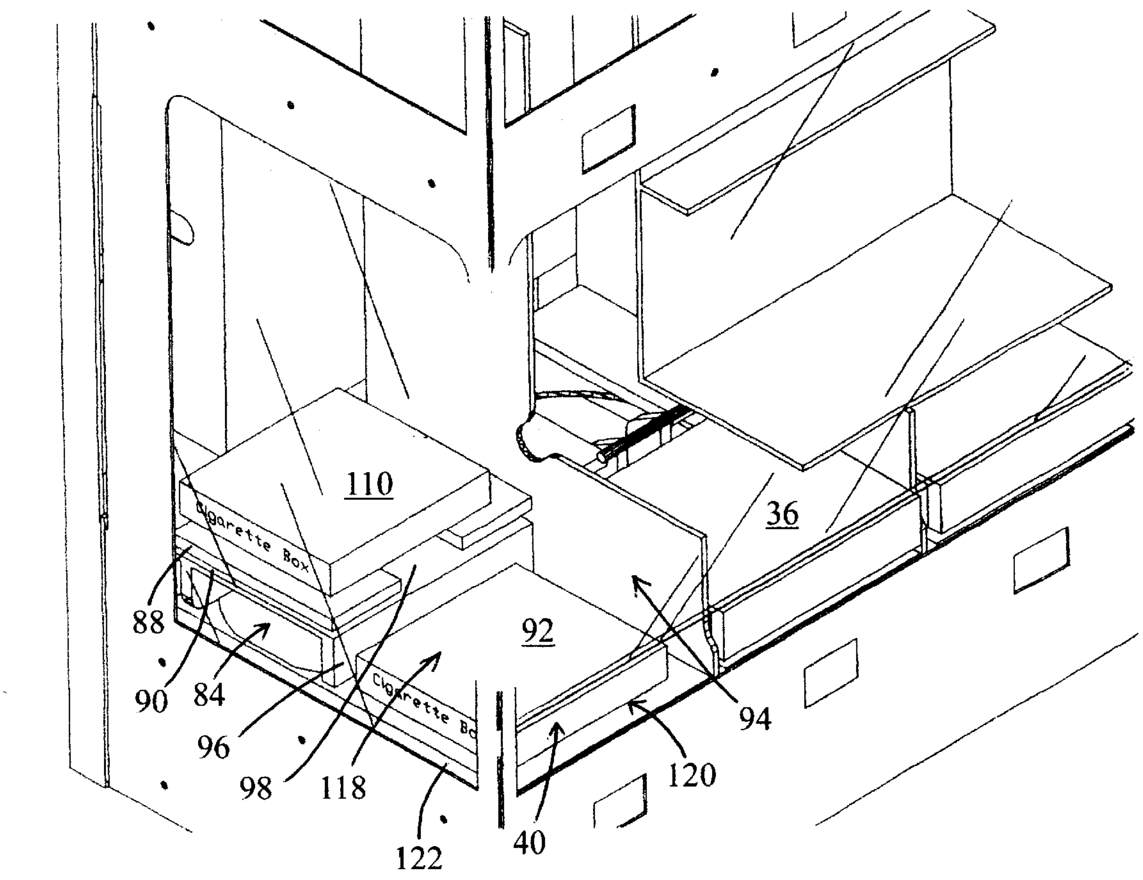
FIG. 8 is a perspective view of the container of FIG. 3, showing th e dispenser in its open position.

Referring to FIGS. 5 and 6, dispenser 84 is shown in an intermediate position moving rearwardly in the direction of arrow 112 from the rest position, depicted in FIGS. 3 and 4 to the open position, as depicted in FIGS. 7 and 8. Angled surface 111 of lateral flanges 106 directs second cigarette package 110 upwardly allowing bar 102 to move under cigarette package 110 as dispenser 84 is moved rearwardly in the direction of arrow 112. Rear panel 114 provides a first contact in the storage region 86 to prevent movement of cigarette package 110 rearwardly on movement of dispenser 84 in the direction of arrow 112. As well, platform 88 includes edge 116 which provides an interference means preventing movement of first cigarette package 92 past edge 116 when platform 90 is moved with dispenser 84 in the direction of arrow 112.

Display case 56 is supported underneath by lower portion 80 of adjacent dividers 76. Rear panel 60 contacts upper portion 78 and is thereby held in position against adjacent dividers 76.

Referring to FIGS. 7 and 8, dispenser 84 is in its open position adjacent rear portion 72 of vending machine 10. Platform 90 is positioned below platform 88. Flanges 106 and bar 102 travel through slot 98 as dispenser 84 moves from its rest position, depicted in FIGS. 3 and 4 to its open position as depicted in FIGS. 7 and 8. When dispenser 84 is in its open position an opening 118 is formed between holding region 94 and output region 120. Because output region 120 is below holding region 94, cigarette package 92 will fall due to gravitational forces through opening 118 to output region 120 where it rests on bottom plate 122.

When the dispenser 84 in its open position bar 102 is located to the rear of second cigarette package 110 and second cigarette package 110 lies horizontally resting on platform 88. Bar 102 is positioned adjacent rear edge 124 of cigarette package 110. First cigarette package 92, in output region 120 lies flat adjacent opening 40 on bottom plate 122.

Figure 9:
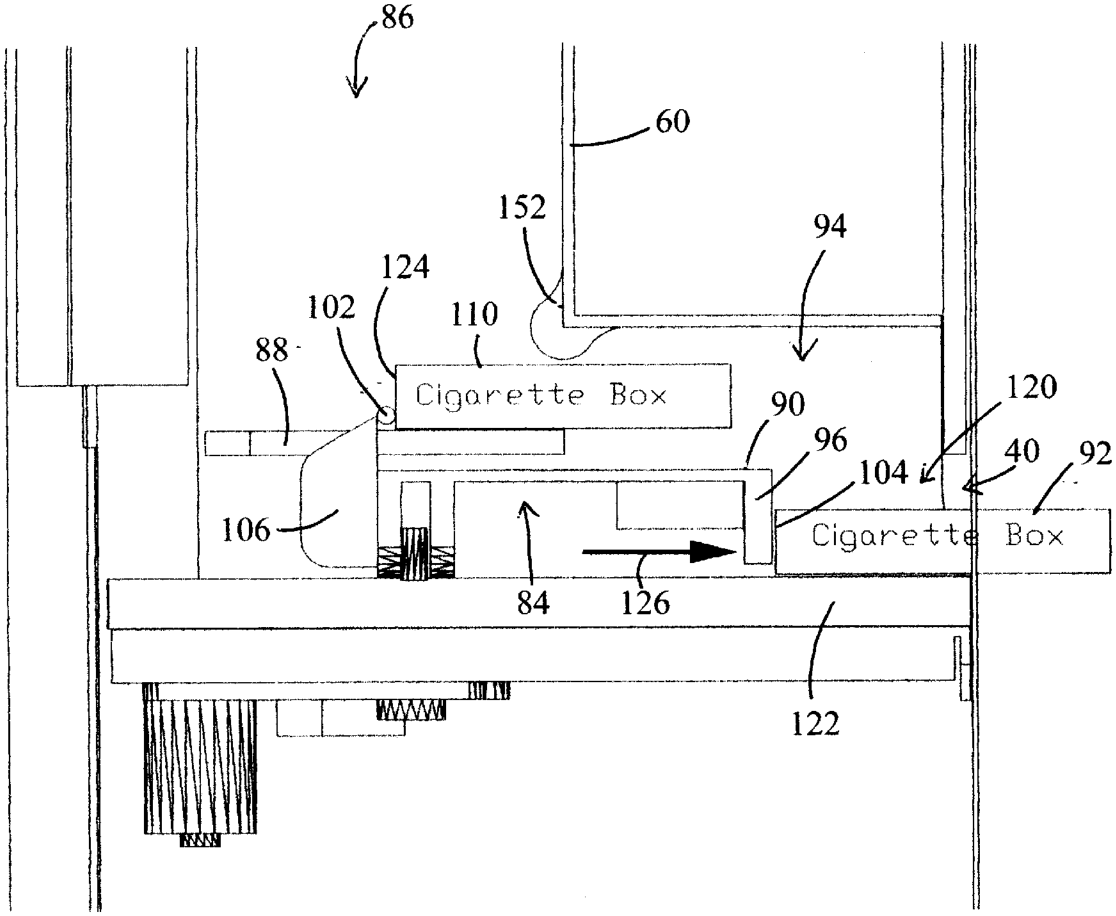
FIG. 9 is a side view of the container of FIG. 3, showing the dispenser in an intermediate position moving from its open position to its rest position.
Figure 10:
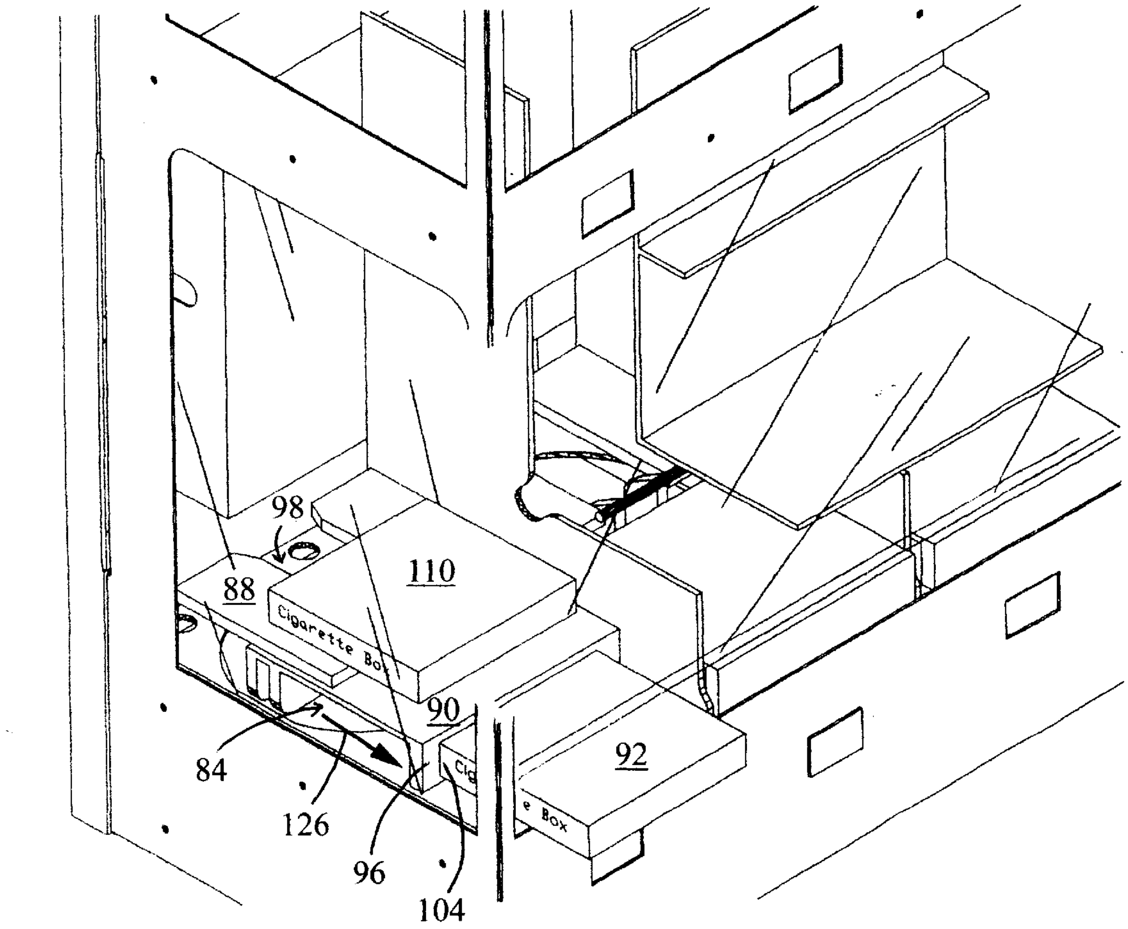
FIG. 10 is a perspective view of the container of FIG. 3, showing the dispenser in an intermediate position moving from its open position to its rest position.

Referring to FIGS. 9 and 10, dispenser 84 is shown in an intermediate position moving in the direction of arrow 126 between its open position, as depicted in FIGS. 7 and 8 and its rest position, as depicted FIGS. 3 and 4. Flange 96 contacts first cigarette package 92 at edge 104 in output region 120 pushing cigarette package 92 in the direction of arrow 126 through opening 40 to dispense cigarette package 92 to the user.

Simultaneously, bar 102 acts as a pusher to push second cigarette package 110 in the direction of arrow 126 along platform 88, by moving along slot 98 in the direction of arrow 126 until cigarette package 110 comes to rest in the holding region resting on platform 90.

Figure 11:
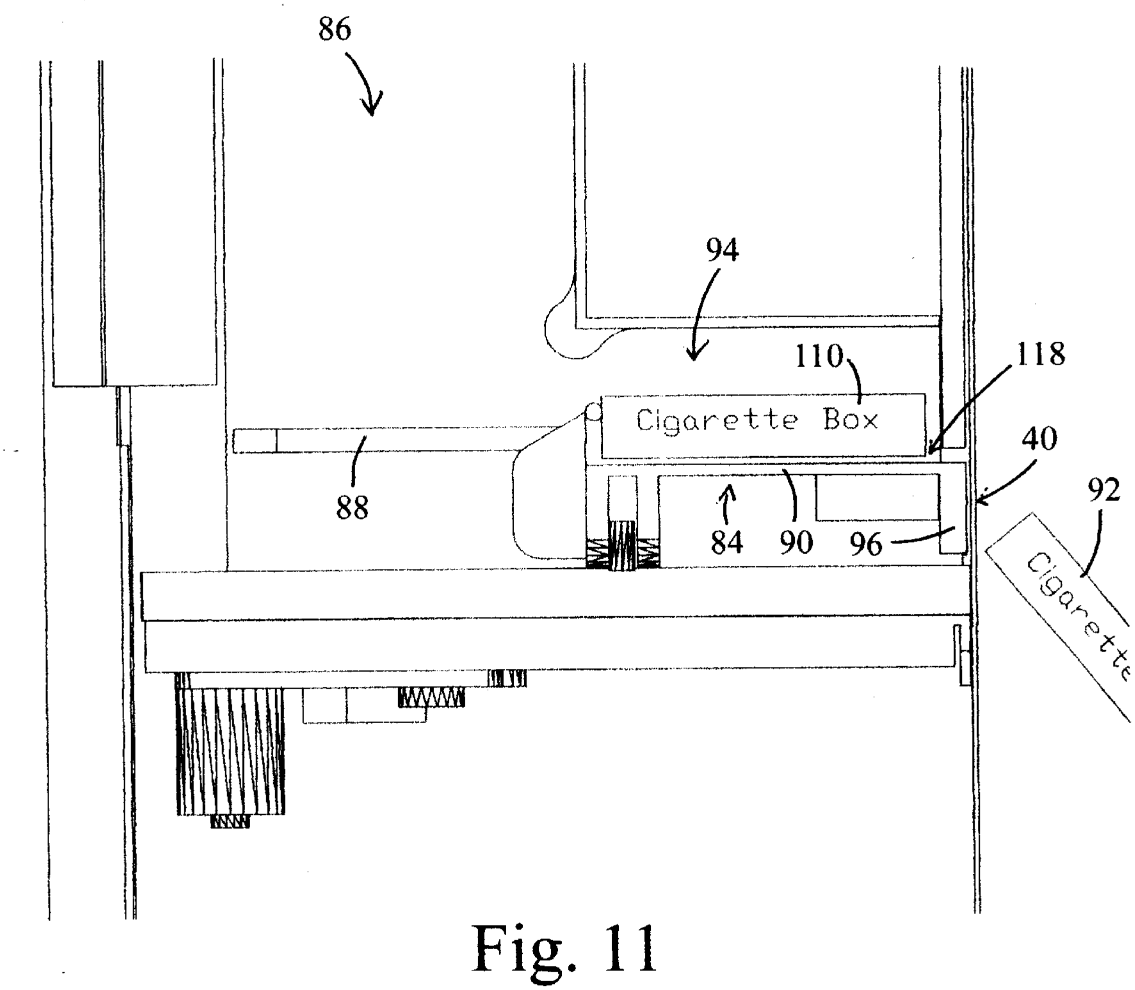
FIG. 11 is a side view of the container of FIG. 3, showing the dispenser in its rest position.
Figure 12:
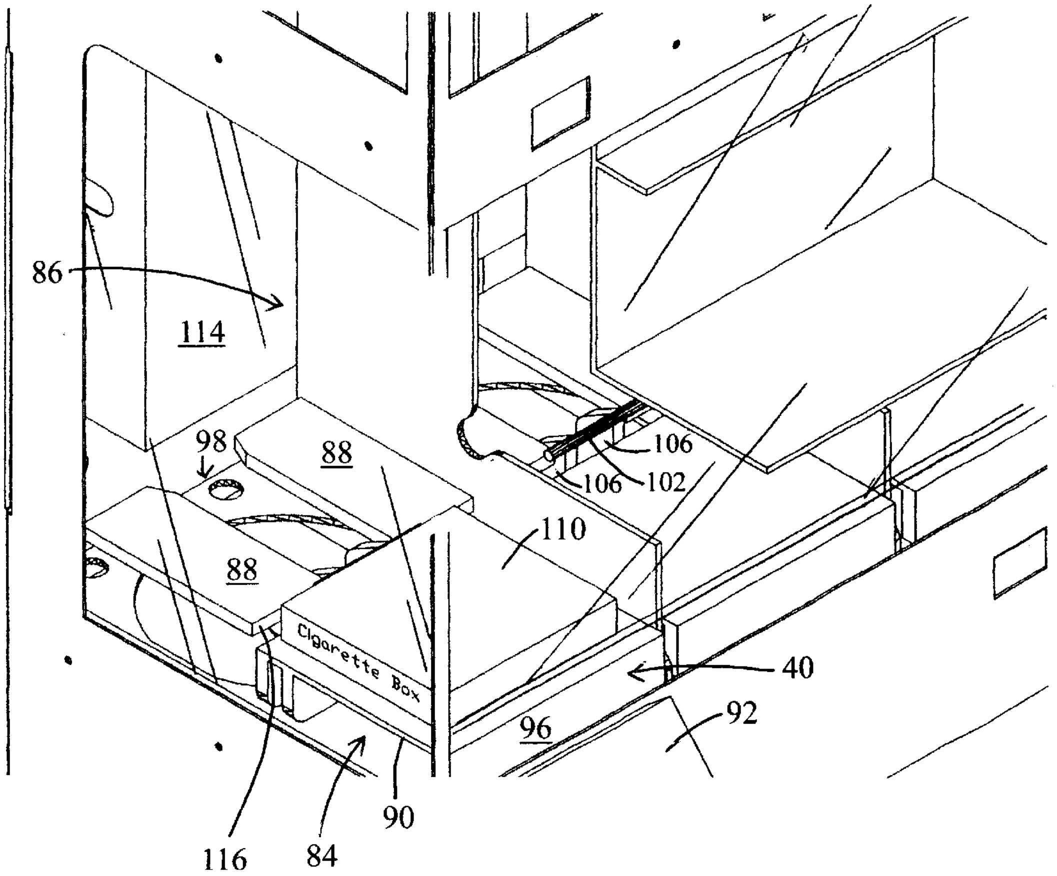
FIG. 12 is a partial perspective view of the container of FIG. 3, showing the dispenser in its rest position.

Referring to FIGS. 11 and 12, dispenser 84 is in its rest position, identical to the rest position depicted in FIGS. 3 and 4, following the dispensing of cigarette package 92 from opening 40, to be retrieved by a user. Flange 96 blocks opening 40 preventing removal of second cigarette package 110 now positioned in holding region 94. Opening 118 is blocked by platform 90 preventing cigarette package 110 moving to output region 120. The rest of the plurality of cigarettes in the storage region 86 drop downwardly by force of gravity to rest on platform 88. The plurality of cigarettes in a vertical stack, are best seen in FIG. 1. For ease of reference, FIGS. 3 through 12 depict only first cigarette package 92 and second cigarette package 110 it being understood that storage region 86 may contain a plurality of vertically stacked cigarette packages as depicted in FIG. 1.

The movement of dispenser 84 between its rest position and its open position will now be discussed with reference to FIGS. 13A, 13B, 14A and 14B. Referring initially to FIGS. 13B and 14B, dispenser 84 is depicted in its rest position with platform 90 and flange 96 in a forward position toward front 68 of vending machine 10. Left segment 100 of platform 88 is shown adjacent slot 98 located between platform 88. Right segment 101 is not shown for ease of view, it being understood that slot 98 is defined at each side by left segment 100 and right segment 101 as depicted in FIG. 4. Platform 90 is constrained for linear movement in the direction of arrows 128 and 130 by dividers 76 and left and right plexiglass sheets 32 and 34.

Bottom plate 122 includes circular openings (not shown) which contains rotatable disk 132 therein. Disk 132 is mounted on axle 134 for rotation about axle 134. Axle 134 is, in turn, connected to a suitable motor (not shown) for impacting rotational movement on axle 134 on actuation by a user actuating switch 54 (FIG. 1).

As best seen in FIG. 14B, disk 132 includes pin 136 extending upwardly from disk 132 at an outer periphery of disk 132. Platform 90 includes inner flange 138 which extends parallel with rear flange 108 forming slot 140 between flanges 108 and 138. Slot 140 is dimensioned to accept pin 136 therein for slidable engagement along slot 140.

On rotation of disk 132 in the direction of arrow 142 pin 136 will travel along slot 140 in the direction of arrow 144 causing platform 90 to be moved in the direction of arrow 128.

Figure 13A:
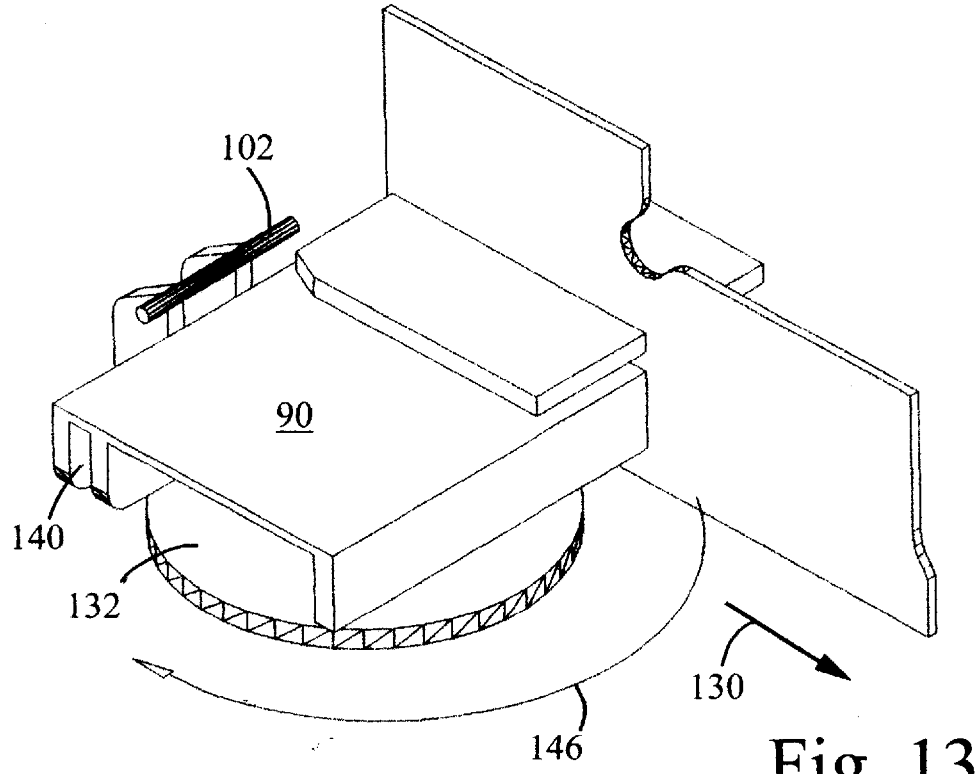
FIG. 13A is a perspective view of components of the dispenser showing the dispenser in its open position.
Figure 13B:
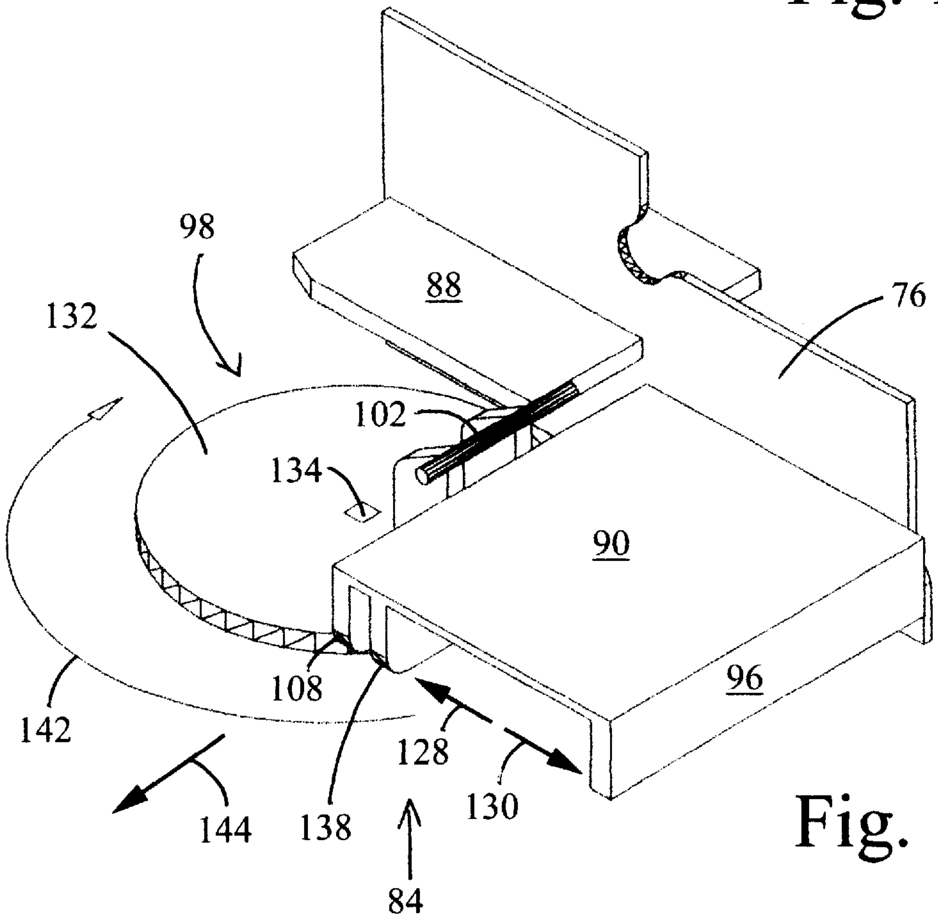
FIG. 13B is perspective view of the components of the dispenser of FIG. 13A, with the dispenser in its rest position.
Figure 14A:
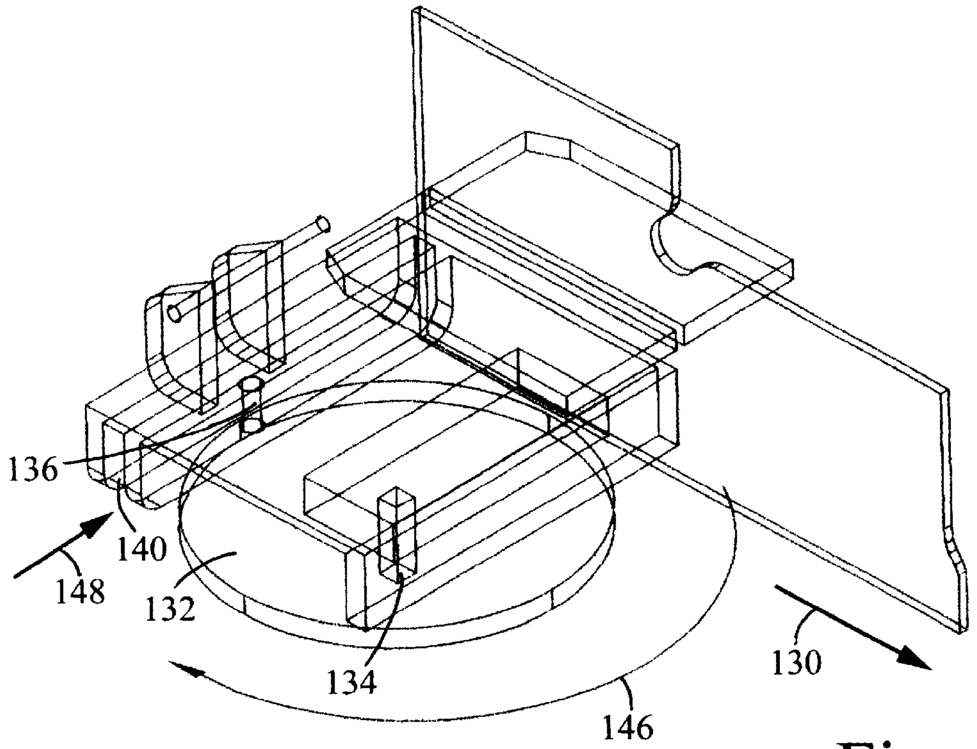
FIG. 14A is a perspective view of components of the dispenser, showing internal components, with the dispenser in its open position.
Figure 14B:
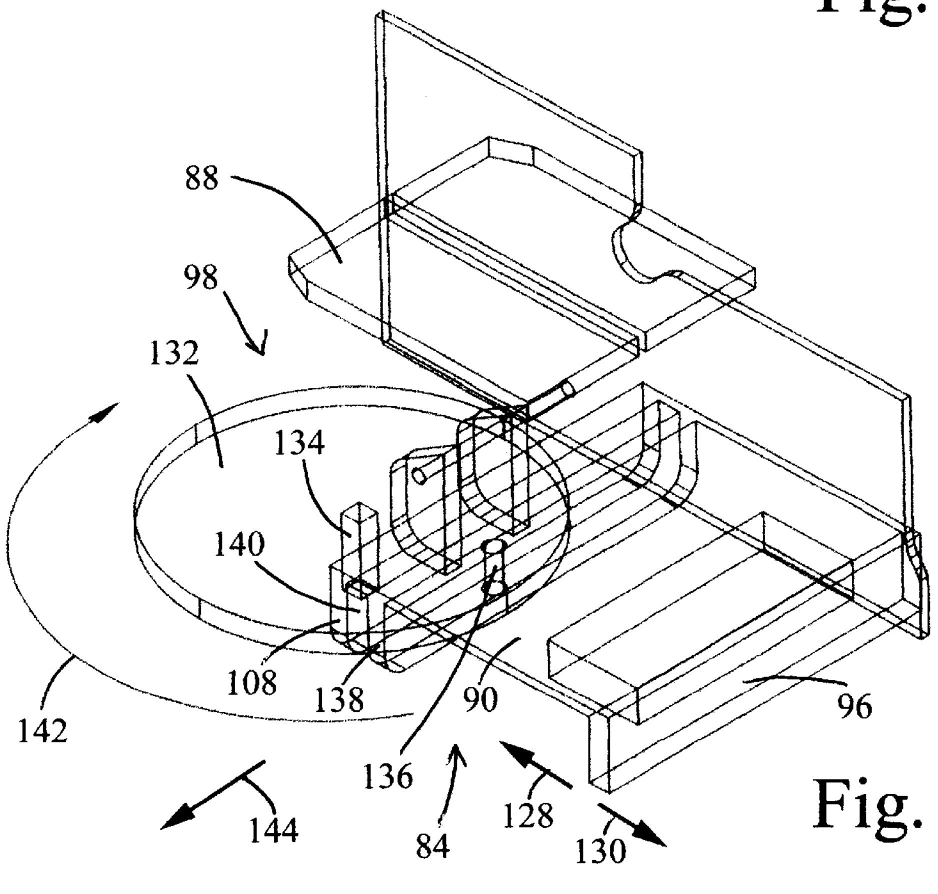
FIG. 14B is a perspective view of the components of the dispenser of FIG. 14A, showing internal components, with the dispenser in its rest position.

Referring to FIGS. 13A and 13B, platform 90 is in its open position. On rotation of disk 132 in the direction of arrow 146 pin 136 will move in the direction of arrow 148 along slot 140. This causes platform 90 to move in the direction of arrow 130 back to the rest position as depicted in FIG. 13B.

Operation

The operation of vending machine 10 will now be discussed with reference to the figures. Most of the time vending machine 10 will be at rest with dispenser 84 in its rest position, as depicted in FIGS. 1, 2, 3 and 4. Flange 96 blocks opening 40 preventing access to the cigarette packages from the front of vending machine 10 through opening 40. First cigarette package 92 is visible through upper front plexiglass sheet 36 while first cigarette package 92 is in the holding region 94. The user may view each type of cigarette package in each of the plurality of cigarette package storage and dispensing containers 52. Each container may, for example, contain a different brand of cigarettes and the cigarette packages 58 in display case 56 will correspond to the brand of cigarette package in the adjacent container 52. The user decides which brand of cigarette he or she desires and actuates switch 54 adjacent to the one of the containers 52 containing the desired cigarette package. This actuates the motor (not shown) to rotate disk 132 of that container 52 in the direction of arrow 142 as depicted in FIGS. 13A and 13B. This rotation of disk 132 causes platform 90 to move in the direction of arrow 128 as depicted in FIG. 13B which is the same as direction as arrow 112 in FIGS. 5 and 6.

Referring to FIGS. 5 and 6 on movement of platform 90 in the direction of arrow 112, cigarette package 92 moves in the same direction until it contacts edge 116 and is then held in place in holding region 94 until platform 90 moves a sufficient distance whereby platform 90 can no longer hold cigarette package 92 and opening 112 is large enough to permit gravity to allow cigarette package 92 to fall from holding region 94 to output region 120. At the same time bar 102, which is connected to platform 90 by means of flanges 106 moves in the direction of arrow 112 underneath second cigarette package 110. Initially, angled surface 111, which is angled downwardly from bar 102 to the plane of the platform in a direction toward storage region 86, directs second cigarette package 110 upwardly to permit bar 102 to move underneath second cigarette package 110, as depicted in FIG. 5.

On further rotation of disk 132 in the direction of arrow 142 (FIGS. 13B and 14B), dispenser 84 moves to its open position, as depicted in FIGS. 7 and 8. Referring to FIGS. 7 and 8, bar 102 is then positioned behind cigarette package 110 adjacent edge 124 of package 110. At the same time opening 118 extends between edge 116 and upper front plexiglass sheet 36. As discussed above, cigarette package 92 is then free to drop by gravitational force from holding region 94 to output region 120. First cigarette package 92 then rests on bottom plate 122 aligned with flange 96 adjacent edge 104 and aligned with opening 40 at its opposite edge 150.

On rotation of disk 132 in the direction of arrow 146 (FIGS. 13A and 14A), pin 136 moves in the direction of arrow 148 to move platform 90 in the direction of arrow 130, which is also the direction of arrow 126 as shown in FIGS. 9 and 10.

Referring to FIGS. 9 and 10, movement of platform 90 in the direction of arrow 126 moves flange 96 in that direction to contact edge 104 of cigarette package 92 moving cigarette package 104 through opening 40. At the same time bar 102 moves with platform 90 in the direction of arrow 126 to contact edge 124 of second cigarette package 110 to move second cigarette package 110 along platform 88 from storage region 86 to holding region 94. The lower rear edge 152 of rear panel 60 prevents other cigarette packages of the plurality in storage region 86 from travelling with cigarette package 110 in the direction of arrow 126.

On further movement of platform 190 in the direction 126 toward the rest position, cigarette package 92 will exit opening 40 to be received by the user. As well cigarette package 110 will be moved sufficiently in the direction of area 126 to fall from platform 88 to platform 90 by force of gravity to rest on platform 90 in the holding region 94, as depicted in FIGS. 11 and 12. This returns dispenser 84 to its rest position ready for actuation by a user to obtain second cigarette package 110 in the manner discussed above.

Having described the present invention in detail in a preferred embodiment, it is obvious that one skilled in the art will be able to make modifications and variations thereto without departing from the scope of the invention. Accordingly, the scope of the present invention should be determined by the claims appended hereto.

I claim:

1. A vending machine for selectively dispensing cigarette packages on actuation by a user, comprising at least one cigarette package storage and dispensing container, each container comprising:

(a) a storage region for storing a plurality of cigarette packages;

(b) a holding region communicating with the storage region to receive a first cigarette package from the plurality in the storage region;

(c) an output region communicating with the holding region to receive the first cigarette package from the holding region for dispensing the first cigarette package from the output region to the user;

(d) a dispenser moveable between a rest position and an open position, the dispenser holding the first cigarette package in the holding region when in its rest position and, on actuation by a user, the dispenser first moving to its open position from its rest position causing the first cigarette package to move from the holding region to the output region, and then moving from its open position to its rest position to dispense the first cigarette package from the output region to the user and simultaneously move a second cigarette package of the plurality from the storage region to the holding region.

2. The machine as described in claim 1, wherein the holding region comprises a viewing window for viewing at least some of the identification indicia of the first cigarette package in the holding region of the container.

3. The machine as described in claim 1, wherein the dispenser comprises a platform for holding the first cigarette package in the holding region when the dispenser is in its rest position.

4. The machine as described in claim 3, wherein the dispenser further comprises a first pusher connected to the platform, the first pusher contacting the first cigarette package in the output region on movement of the dispenser from its open position to its rest position to move the first cigarette package from the output region to the user.

5. The machine as described in claim 4, further comprising a second pusher connected to the platform, the second pusher contacting the second cigarette package of the plurality in the storage region on movement of the dispenser from its open position to its rest position, to move the second cigarette package from the storage region to the holding region.

6. The machine as described in claim 5, wherein the second pusher further comprises a guide configured to facilitate movement of the second pusher past the second cigarette package of the plurality in the storage region when the dispenser is moved from its rest position to its open position.

7. The machine as described in claim 6, wherein the second pusher is positioned adjacent the second cigarette package of the plurality of cigarette packages in the holding region on the side of the second cigarette package opposite the side adjacent the holding region when the dispenser is in its open position.

8. The machine as described in claim 3, further comprising interference means preventing movement of the first cigarette package in the direction of movement of the platform when the dispenser is moved from its rest position to its open position.

9. The machine as described in claim 8, wherein the platform is located above the output region when the dispenser is in its rest position and wherein an opening from the holding region to the output region is formed when the dispenser is moved to its open position to permit the first cigarette package in the holding region to move into the output region.

10. The machine as described in claim 9, wherein the first cigarette package is accessible by a user for removal when the dispenser is moved to its rest position to dispense the first cigarette package from the output region.

11. The machine as described in claim 10, wherein the platform blocks access to the output region, preventing removal of cigarette packages from the output region by a user when the dispenser is in its rest position.

12. The machine as described in claim 9, wherein the storage region stores the plurality of cigarette packages in a vertical stack and wherein the second cigarette package is the lower most cigarette package of the stack and where gravity lowers the cigarette package adjacent the second cigarette package to the lowermost position of the stack upon movement of the dispenser from its open position to its rest position to move the second cigarette package to the holding region and wherein the first cigarette package is moved through the opening by gravitational force.

13. The machine as described in claim 3, wherein the platform is constrained for lateral movement between a first position, when the dispenser is in its rest position, and a second position, when the dispenser is in its open position, and wherein the platform further comprises a slot perpendicular to the direction of movement between the first and second positions and wherein the vending machine further comprises a rotatable disc connected to a pin and wherein the pin travels within the slot upon rotation of the disc to move the platform between the first and second positions.

14. The machine as described in claim 13, wherein the holding region is connected to the storage region by means of a second opening dimensioned slightly larger than a side of the second cigarette package and wherein the opening prevents more than one cigarette package of the plurality moving from the storage region to the holding region when the dispenser moves from its open position to its rest position to move the second cigarette package from the storage region to the holding region.

15. The machine as described in claim 5, wherein the storage region comprises a second platform supporting the plurality of cigarette packages.

16. The machine as described in claim 15, wherein the second platform further comprises a slot and wherein the second pusher passes through the slot when the dispenser is moved from its rest position to its open position and back to its rest position.

17. The machine as described in claim 5, wherein the second pusher is dimensioned in height from the platform so as to contact the second cigarette package and move it to the holding region upon movement of the dispenser from its open position to its rest position, without causing other cigarette packages of the plurality to move to the holding position.

18. The machine as described in claim 17, wherein the storage region comprises a first contact preventing movement of the other cigarette packages of the plurality in the direction of the second cigarette package when the second pusher moves the second cigarette package to the holding region.

19. The machine as described in claim 18, wherein the first contact comprises an opening between the holding region and storage region dimensioned slightly larger than a side of the second cigarette package to prevent more cigarette packages than the second cigarette package moving from the storage region to the holding region when the dispenser moves from its open position to its rest position to move the second cigarette package from the storage region to the holding region.

20. The machine as described in claim 6, wherein the storage region comprises a second contact preventing movement of the second cigarette package in the direction of movement of the second pusher when the dispenser is moved from its rest position to its open position.

21. The machine as described in claim 6, wherein the platform is oriented in a horizontal plane and the guide is angled downwardly from the second pusher to the plane of the platform in a direction toward the storage region to direct the second cigarette package upwardly when the second pusher is moved upon movement of the dispenser from its rest position to its open position.

22. A dispenser for selectively dispensing cigarette packages in a vending machine to a user, the vending machine comprising a storage region for storing a plurality of cigarette packages, a holding region communicating with the storage region to receive a cigarette package from the plurality in the storage region and an output region communicating with the holding region to receive the cigarette package from the holding region for dispensing the cigarette package from the output region to the user, the dispenser comprising a platform movable between a rest position and an open position, the platform holding the cigarette package in the holding region when in its rest position and, on actuation by a user, the platform first moving to its open position from its rest position to cause the first cigarette package to move from the holding region to the output and then moving from its open position to its rest position to dispense the first cigarette package from the output region to the user and simultaneously move a second cigarette package of the plurality from the storage region to the holding region.

23. A method of selectively dispensing cigarette packages from a vending machine on actuation by a user, the vending machine comprising a storage region for storing a plurality of cigarette packages, a holding region communicating with the storage region to receive a first cigarette package from the plurality in the storage region, an output region communicating with the holding region to receive the cigarette package from the holding region for dispensing the first cigarette package from the output region to the user, and a platform moveable between a seat position and an open position comprising the steps of:

(a) actuating the vending machine by selecting a desired cigarette package from the plurality of cigarette packages in the vending machine;

(b) moving the selected cigarette package from the holding region to the output region by movement of the platform from its rest position to its open position;

(c) moving the cigarette package from the output region to the user by moving the platform from its open position to its rest position;

(d) simultaneously with step (c), moving another cigarette package of the plurality from the storage region to the holding region; and (e) retaining another cigarette package in the holding region until further actuation of the vending machine.

* * * * *